(12) United States Patent
Chung et al.

(10) Patent No.: US 10,372,430 B2
(45) Date of Patent: Aug. 6, 2019

(54) METHOD OF COMPILING A PROGRAM

(71) Applicant: SAMSUNG ELECTRONICS CO., LTD., Suwon-si, Gyeonggi-do (KR)

(72) Inventors: Hye-Yeon Chung, Suwon-si (KR);
Han-Jun Kim, Pohang-si (KR);
Jong-Won Lee, Seongnam-si (KR);
Chang-Su Kim, Pohang-si (KR);
Seon-Yeong Heo, Pohang-si (KR);
Jun-Mo Park, Hwaseong-si (KR);
Jong-Hee Yoon, Seoul (KR)

(73) Assignees: SAMSUNG ELECTRONICS CO., LTD., Suwon-si, Gyeonggi-Do (KR);
POSTECH ACADEMY-INDUSTRY FOUNDATION, Pohang-si, Gyeongsangbuk-Do (KR)

( * ) Notice: Subject to any disclaimer, the term of this patent is extended or adjusted under 35 U.S.C. 154(b) by 17 days.

(21) Appl. No.: 15/867,168

(22) Filed: Jan. 10, 2018

(65) Prior Publication Data
US 2018/0373510 A1  Dec. 27, 2018

(30) Foreign Application Priority Data
Jun. 26, 2017  (KR) ........................ 10-2017-0080764

(51) Int. Cl.
*G06F 9/44* (2018.01)
*G06F 8/41* (2018.01)
*G06N 20/00* (2019.01)

(52) U.S. Cl.
CPC ............ *G06F 8/443* (2013.01); *G06F 8/4441* (2013.01); *G06F 8/48* (2013.01); *G06N 20/00* (2019.01); *G06F 8/4434* (2013.01)

(58) Field of Classification Search
None
See application file for complete search history.

(56) References Cited

U.S. PATENT DOCUMENTS

| 5,862,384 A | 1/1999 | Hirai | |
|---|---|---|---|
| 6,978,450 B2 * | 12/2005 | Burch | G06F 8/48 715/229 |

(Continued)

OTHER PUBLICATIONS

Pouchet et al., Combined Iterative and Model-driven Optimization in an Automatic Parallelization Framework, IEEE, SC10 Nov. 2010, (Year: 2010).*

(Continued)

*Primary Examiner* — Insun Kang
(74) *Attorney, Agent, or Firm* — F. Chau & Associates, LLC

(57) ABSTRACT

In a method of compiling an updated program having a plurality of updated functions that is updated from an original program having a plurality of original functions, it is determined whether a first original function corresponding to a first updated function exists, it is determined whether the first updated function is changed from the first original function, a first optimization combination for the first updated function is searched when the first original function does not exist or when the first updated function is changed from the first original function, a second optimization combination applied to the first original function is read from a configuration database storing optimization combinations for the original functions when the first original function exists and the first updated function is not changed from the first original function, and the updated program is compiled using the first optimization combination or the second optimization combination.

20 Claims, 11 Drawing Sheets

(56) References Cited

U.S. PATENT DOCUMENTS

| | | | |
|---|---|---|---|
| 7,000,227 B1 | 2/2006 | Henry | |
| 8,136,092 B2 | 3/2012 | Deedwaniya et al. | |
| 9,372,678 B2 | 6/2016 | Bikshandi et al. | |
| 2002/0032718 A1* | 3/2002 | Yates | G06F 9/4486 718/107 |
| 2002/0046400 A1* | 4/2002 | Burch | G06F 8/48 717/154 |
| 2002/0073406 A1 | 6/2002 | Gove | |
| 2006/0236310 A1 | 10/2006 | Domeika et al. | |
| 2007/0226698 A1* | 9/2007 | Cascaval | G06F 9/45516 717/127 |
| 2009/0064117 A1* | 3/2009 | Bashkansky | G06F 8/443 717/154 |
| 2009/0193402 A1 | 7/2009 | Bashkansky et al. | |
| 2013/0305230 A1* | 11/2013 | Inoue | G06F 8/443 717/153 |
| 2014/0047416 A1* | 2/2014 | Pizlo | G06F 8/443 717/128 |
| 2015/0186144 A1* | 7/2015 | Abdallah | G06F 9/3808 712/206 |
| 2015/0268940 A1 | 9/2015 | Baghsorkhi et al. | |
| 2016/0004518 A1* | 1/2016 | Sharma | G06F 8/443 717/157 |
| 2016/0117154 A1* | 4/2016 | Przygienda | G06F 8/443 717/152 |
| 2016/0321046 A1* | 11/2016 | Pizlo | G06F 8/443 |
| 2017/0168791 A1* | 6/2017 | Nay | G06F 8/443 |
| 2017/0242716 A1* | 8/2017 | Chung | G06F 9/45525 |
| 2018/0074798 A1* | 3/2018 | Ambrose | G06F 8/35 |
| 2018/0218276 A1* | 8/2018 | Suman | G06N 20/00 |
| 2019/0012155 A1* | 1/2019 | Oey | G06F 8/456 |

OTHER PUBLICATIONS

Xin et al., HELIX: Holistic Optimization for Accelerating Iterative Machine Learning, Jun. 15, 2016, www.vldb.org/pvldb/vol12/p446-xin.pdf (Year: 2016).*

Bonilla et al., Using Machine Learning to Focus Iterative Optimization, Jan. 16, 2006 (Year: 2006).*

Kisuki, Iterative Compilation in Program Optimization—CiteSeerX, 2002 (Year: 2002).*

Chen, Yang et al., "Deconstructing Iterative Optimization", ACM Transactions on Architecture and Code Optimization, vol. 9, No. 3, Article 21, Publication Dated: Sep. 2012, pp. 21:1-21:30.

* cited by examiner

FIG. 3

| Optimization passes | Parameters | Optimization passes | Parameters |
|---|---|---|---|
| Constant Propagation | None | Inductive Range Check Elimination | None |
| Dead Inst Elimination | None | IndVar Simplify | None |
| Dead Code Elimination | None | Instruction Combining | Bool |
| Dead Store Elimination | None | LICM | None |
| Aggressive DCE | None | Loop Versioning | None |
| Bit Tracking DCE | None | Loop Interchange | None |
| SROA | None | Speculative Execution | None |
| Promote Memory to Register | None | Loop Unswitch | Bool |
| Reassociate | None | Loop Inst Simplify | None |
| Flatten CFG | None | Loop Unroll | Int |
| Structurize CFG | Bool | Loop Reroll | None |
| Tail Call Elimination | None | Loop Rotate | Bool |
| Lower Switch | None | Loop Idiom | None |
| Lower Invoke | None | Loop Simplify | None |
| LCSSA | None | Loop Deletion | None |
| Merged Load Store Motion | None | Constant Hoisting | None |
| Memcpy Opt | None | Sinking | None |
| Lower Atomic | None | Loop Distribute | None |
| Lower Guard Intrinsic | None | Loop Load Elimination | None |
| Correlated Value Propagation | None | Loop Simplify CFG | None |
| Instruction Simplifier | None | Loop Data Prefetch | None |
| Lower Expect Intrinsic | None | Basic Block Vectorize | None |
| Partially Inline Lib Calls | None | Loop Vectorize | None |
| Scalarizer | None | SLP Vectorizer | None |
| GVN | None | Load Combine | None |
| Straight Line Strength Reduce | None | Nary Reassociate | None |
| Float to Int | None | | |

ORIGINAL PROGRAM CALL GRAPH

UPDATED PROGRAM CALL GRAPH

METHOD OF COMPILING A PROGRAM

CROSS-REFERENCE TO RELATED APPLICATION

This U.S. non-provisional application claims priority under 35 U.S.C. § 119 to Korean Patent Application No. 10-2017-0080764, filed on Jun. 26, 2017 in the Korean Intellectual Property Office (KIPO), the disclosure of which is incorporated by reference herein in its entirety.

TECHNICAL FIELD

Exemplary embodiments of the present inventive concept relate to program compilation techniques, and more particularly, to methods of efficiently compiling updated programs.

DISCUSSION OF RELATED ART

A compiler is a translation program that transforms a source language, in which a program is written, into an object language, such as a machine language, which is executable by a computer. While transforming the source language, the compiler may perform optimization to reduce an execution time of the program or to reduce a memory space. A conventional compiler performs uniform (or the same) optimization for different programs, and thus the optimization may not be suitable for all programs, which may have different characteristics. Accordingly, an iterative compilation technique that iteratively compiles a program using different combinations of optimization passes may be used. The iterative compilation technique may perform optimization suitable for different programs.

SUMMARY

According to an exemplary embodiment of the present inventive concept, in a method of compiling an updated program having a plurality of updated functions that is updated from an original program having a plurality of original functions, it is determined whether a first original function among the plurality of original functions corresponding to a first updated function among the plurality of updated functions exists, it is determined whether the first updated function is changed from the first original function, a first optimization combination for the first updated function is searched when the first original function does not exist or when the first updated function is changed from the first original function, a second optimization combination applied to the first original function is read from a configuration database storing optimization combinations for the plurality of original functions when the first original function exists and the first updated function is not changed from the first original function, and the updated program is compiled using the first optimization combination or the second optimization combination.

According to an exemplary embodiment of the present inventive concept, in a method of compiling an updated program having a plurality of updated functions that is updated from an original program having a plurality of original functions, machine learning for optimization combinations is performed according to function features of the plurality of original functions of the original program, it is determined whether a first original function among the plurality of original functions corresponding to a first updated function among the plurality of updated functions exists, a first optimization combination is obtained according to a function feature of the first updated function by using a result of the machine learning when the first original function does not exist, it is determined whether the first updated function is changed from the first original function when the first original function exists, a second optimization combination applied to the first original function is read from a configuration database storing optimization combinations for the plurality of original functions when the first updated function is not changed from the first original function, a third optimization combination for the first updated function is generated by reflecting a fourth optimization combination obtained using the result of the machine learning and a fifth optimization combination applied to the first original function with a change ratio of a function feature of the first updated function to a function feature of the first original function when the first updated function is changed from the first original function, and the updated program is compiled using the first optimization combination, the second optimization combination, or the third optimization combination.

According to an exemplary embodiment of the present inventive concept, in a method of compiling an updated program having a plurality of updated functions that is updated from an original program having a plurality of original functions, an optimization configuration including optimization combinations of the plurality of original functions is obtained by performing iterative compilation for each of the plurality of original functions of the original program, the optimization configuration is stored in a configuration database, it is determined whether a first original function among the plurality of original functions corresponding to a first updated function among the plurality of updated functions exists, it is determined whether the first updated function is changed from the first original function, an optimization combination applied to the first original function, among the optimization combinations included in the optimization configuration, is read from the configuration database when the first original function exists and the first updated function is not changed from the first original function, and the updated program is compiled using the read first optimization combination.

BRIEF DESCRIPTION OF THE DRAWINGS

The above and other features of the present inventive concept will be more clearly understood by describing in detail exemplary embodiments thereof with reference the accompanying drawings.

FIG. 3 is a diagram illustrating a plurality of optimization passes included in an optimization pool of FIGS. 2A and 2B according to exemplary embodiments of the present inventive concept.

DETAILED DESCRIPTION OF THE EMBODIMENTS

Figure 1:
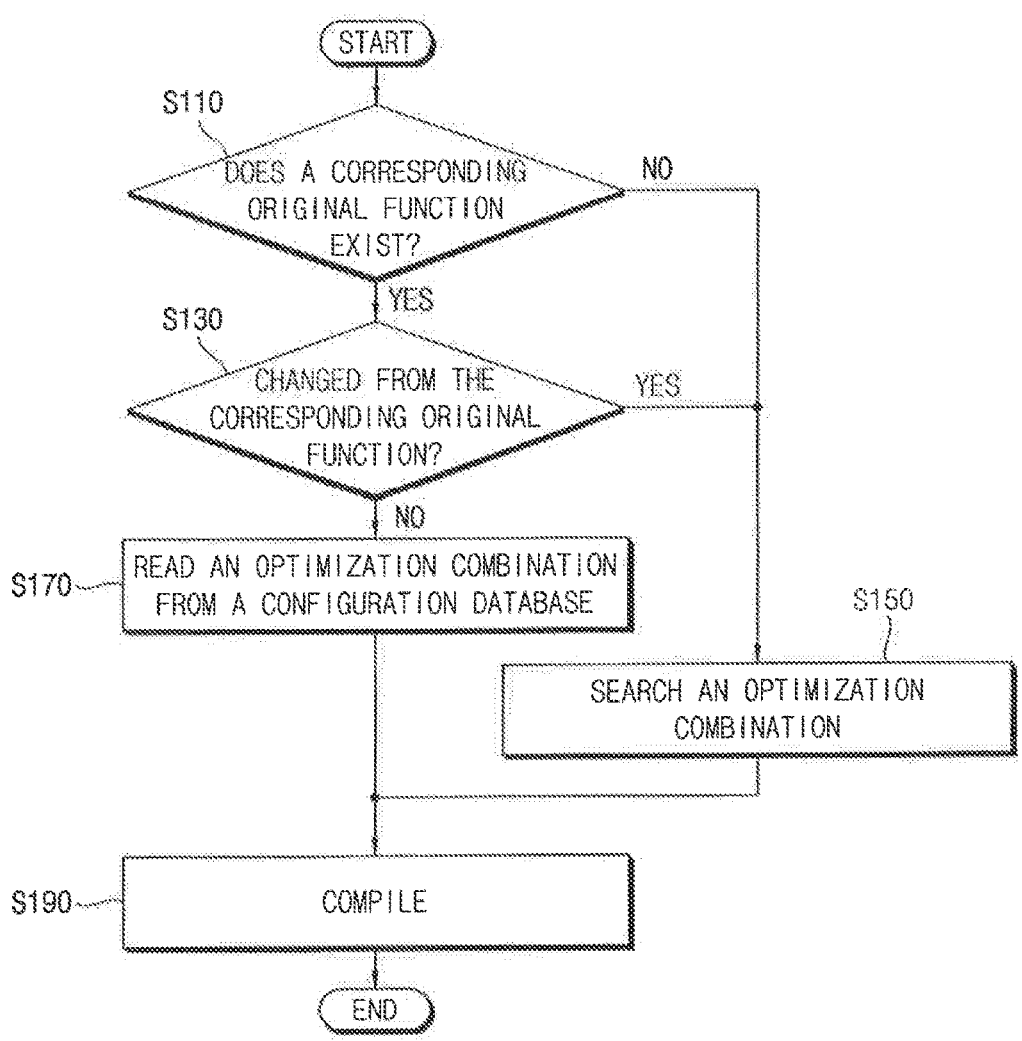
FIG. 1 is a flowchart illustrating a method of compiling an updated program according to exemplary embodiments of the present inventive concept.

Exemplary embodiments of the present inventive concept provide a method of compiling a program capable of reducing compilation time and improving optimization performance.

Exemplary embodiments of the present inventive concept will be more fully described hereinafter with reference to the accompanying drawings. Like reference numerals may refer to like elements throughout this application.

FIG. 1 is a flowchart illustrating a method of compiling an updated program according to exemplary embodiments of the present inventive concept.

Referring to FIG. 1, in a method of compiling an updated program having a plurality of updated functions that is updated from an original program having a plurality of original functions, it may be determined whether an original function among the plurality of original functions corresponding to each of the plurality of updated functions exists (S110). In exemplary embodiments of the present inventive concept, the existence or nonexistence of an original function corresponding to each updated function may be determined using function names and/or calling relationships. For example, it may be determined whether a first original function among the plurality of original functions corresponding to a first updated function among the plurality of updated functions exists. When the first original function corresponding to the first updated function exists (S110: YES), it may be determined whether the first updated function is changed from the first original function (S130). In exemplary embodiments of the present inventive concept, operation S130 may be determined using bloom filter values.

When the first original function corresponding to the first updated function does not exist (S110: NO), or when the first updated function is changed from the first original function (S130: YES), a first optimization combination for the first updated function may be searched (S150). In exemplary embodiments of the present inventive concept, the first optimization combination for the first updated function may be obtained by performing an iterative compilation on the first updated function. In exemplary embodiments of the present inventive concept, the first optimization combination for the first updated function may be obtained by a result of machine learning, e.g., through a machine learning model. In exemplary embodiments of the present inventive concept, the first optimization combination for the first updated function may be generated by reflecting an optimization combination applied to the first original function and the optimization combination obtained using machine learning with a ratio corresponding to a change amount of the first updated function from the first original function.

When the first original function corresponding to the first updated function exists (S110: YES) and the first updated function is not changed from the first original function (S130: NO), a second optimization combination applied to the first original function may be read from a configuration database storing optimization combinations for the original functions (S170). Thus, with respect to the first updated function that is not changed from the first original function, the second optimization combination that was previously applied to the first original function and was previously stored in the configuration database may be used without an additional optimization combination search, such as an additional iterative compilation. Accordingly, a compilation time of the updated program may be reduced.

For example, if an updated bloom filter value that is calculated by performing bloom filtering on instructions included in the first updated function is the same as an original bloom filter value that is calculated by performing bloom filtering on instructions included in the first original function, the first updated function may be determined as unchanged from the first original function. In other words, the bloom filter value of the first updated function is the same as the bloom filter value of the first original function. Further, the optimization combination (e.g., each of the first optimization combination and the second optimization combination) may refer to optimization combination information about a combination of optimization passes that are to be applied in a predetermined order when being compiled, or may refer to the combination of optimization passes (having the predetermined order of application) indicated by the optimization combination information. In exemplary embodiments of the present inventive concept, the optimization combination (or the optimization combination information) may include information about whether corresponding optimization passes of a plurality of optimization passes included in an optimization pool are applied or not, parameters of the applied optimization passes, and an order of the applied optimization passes.

The updated program may be compiled using the newly searched first optimization combination for the first updated function that has no corresponding original function or is changed from the first original function and using the second optimization combination read from the configuration database for the first updated function that has the corresponding first original function and is not changed from the first original function (S190). Accordingly, the compilation time may be reduced while improving the optimization performance for the updated program.

An iterative compilation technique may search and apply an optimization combination suitable for each of different programs. However, a conventional iterative compilation technique may search and apply the optimization combination on a program-by-program basis, and thus may not perform the optimization suitable for each of different functions included in the same program. However, in the compilation method according to exemplary embodiments of the present inventive concept, the optimization combination suitable for a characteristic of each function may be searched and applied by performing the iterative compilation on a function-by-function basis. Further, in the compilation method according to exemplary embodiments of the present inventive concept, when the updated program is updated from the original program, the second optimization combination previously applied to the corresponding first original function may be used for the first updated function that is not changed from the first original function. Accordingly, the compilation method according to exemplary embodiments of the present inventive concept may reduce the compilation time and improve optimization performance.

Figure 2A:
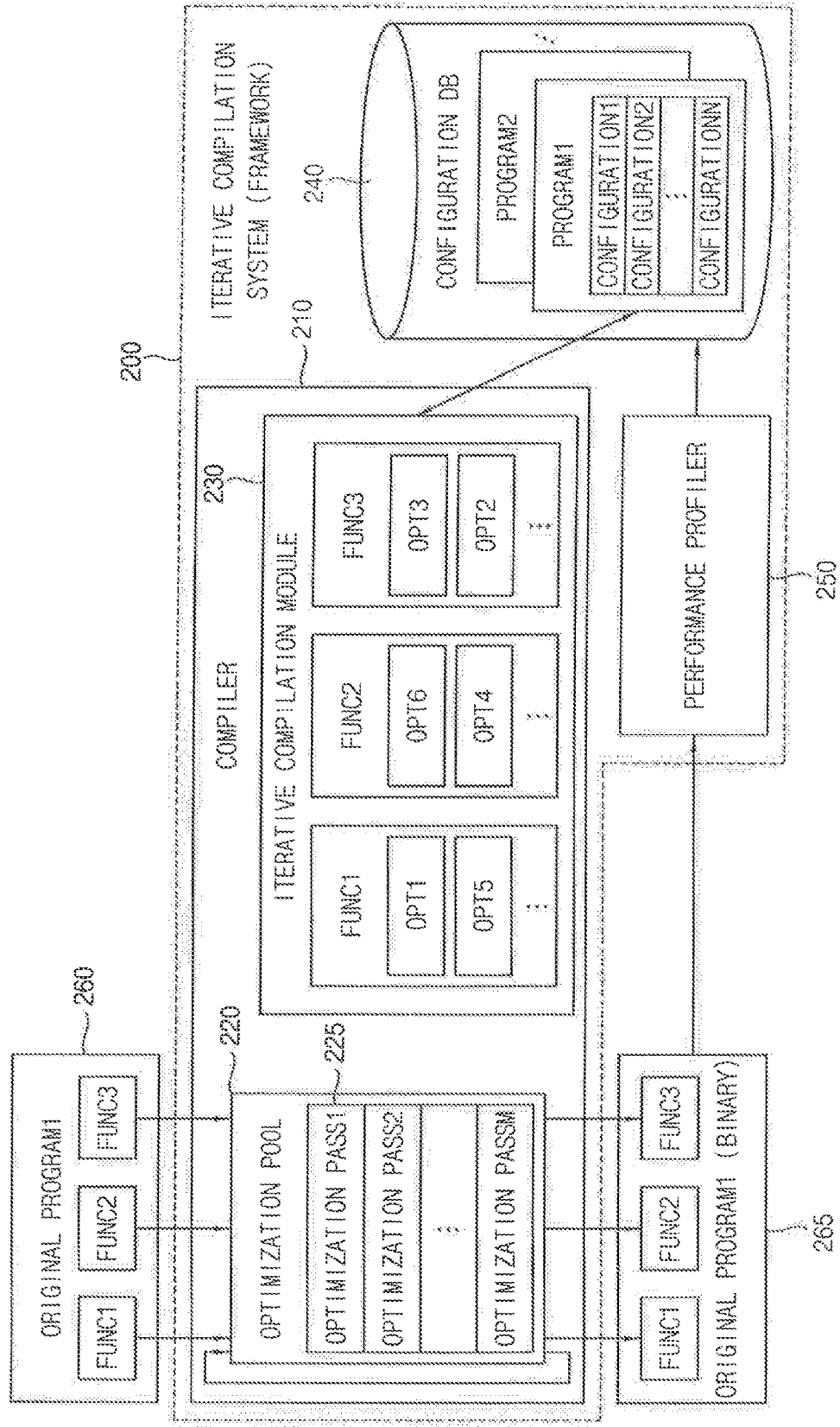
FIG. 2A is a block diagram illustrating an iterative compilation system compiling an original program according to exemplary embodiments of the present inventive concept.
Figure 2B:
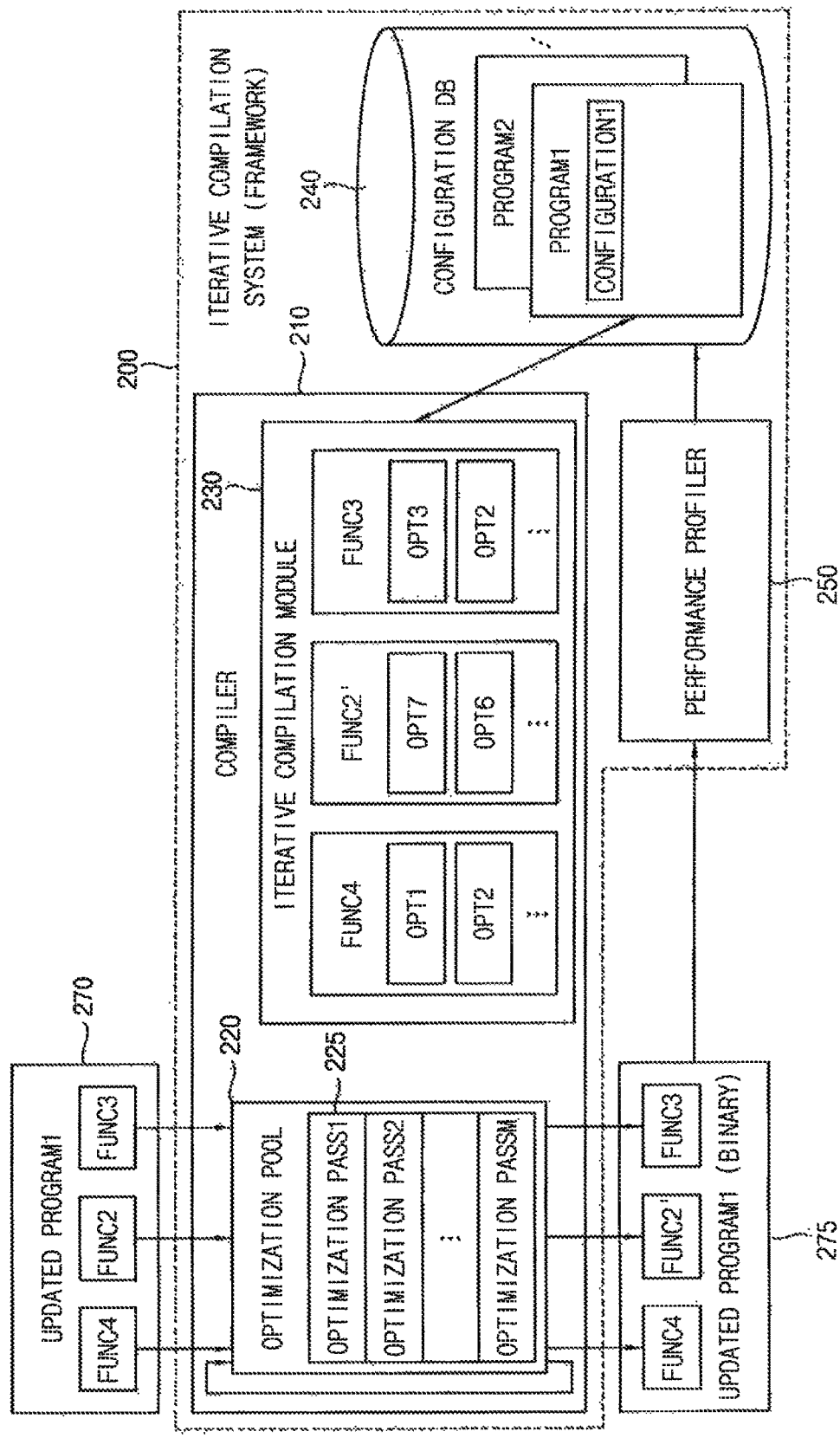
FIG. 2B is a block diagram illustrating the iterative compilation system of FIG. 2A compiling an updated program according to exemplary embodiments of the present inventive concept.

FIG. 2A is a block diagram illustrating an iterative compilation system compiling an original program according to exemplary embodiments of the present inventive concept, FIG. 2B is a block diagram illustrating the iterative compilation system of FIG. 2A compiling an updated program according to exemplary embodiments of the present inventive concept, and FIG. 3 is a diagram illustrating a plurality of optimization passes included in an optimization pool of FIGS. 2A and 2B according to exemplary embodiments of the present inventive concept.

Referring to FIGS. 2A and 2B, an iterative compilation system (or an iterative compilation framework) 200 that performs a compilation method according to exemplary embodiments of the present inventive concept may include a compiler 210, a configuration database 240, and a performance profiler 250. The configuration database 240 may be implemented with any storage device. The compiler 210 and the performance profiler 250 may be implemented with software, hardware, and/or a combination thereof.

The compiler 210 may transform a source program 260 and 270 written in a source language into an object (or target) program 265 and 275 having an object language, such as a machine language, which is executable by a computer. Further, the compiler 210 may search and apply an optimization combination suitable for each function (e.g., FUNC1, FUNC2, or FUNC3) included in each program (e.g., 260) when compiling the program. To perform these operations, the compiler 210 may include an optimization pool 220 having a plurality of optimization passes 225, and an iterative compilation module 230 that combines and sets the optimization passes 225 of the optimization pool 220 with respect to each function (e.g., FUNC1, FUNC2, or FUNC3).

For example, as illustrated in a table 300 of FIG. 3, the optimization passes 225 included in the optimization pool 220 may include constant propagation, dead instruction elimination, dead code elimination, dead store elimination, aggressive dead code elimination (DCE), bit tracking DCE, scalar replacement of aggregate (SROA), promote memory to register, reassociate, control flow graph (CFG) flatten, CFG structurize, tail call elimination, lower switch, lower invoke, loop closed static single assignment (LCSSA), merged load store motion, memcpy optimization, lower atomic, lower guard intrinsic, correlated value propagation, instruction simplifier, lower expect intrinsic, partially inline library calls, scalarizer, global value numbering (GVN), straight line strength reduce, float to integer, inductive range check elimination, induction variable (IndVar) Simplify, instruction combining, loop invariant code motion (LICM), loop versioning, loop interchange, speculative execution, loop unswitch, loop instruction simplify, loop unroll, loop reroll, loop rotate, loop idiom, loop simplify, loop deletion, constant hoisting, sinking, loop distribute, loop load elimination, loop simplify CFG, loop data prefetch, basic block vectorize, loop vectorize, supper word level parallelism (SLP) vectorizer, load combine, N-ary reassociate, or the like, but is not limited thereto. A portion of the optimization passes 225 included in the optimization pool 220 may not have parameters (or may have parameters of "NONE"). Another portion of the optimization passes 225 may have effective parameters. For example, the optimization passes 225 of CFG structurize, instruction combining, loop unswitch, and loop rotate may have, but are not limited to, parameters of Boolean type, e.g., "true" or "false", and the optimization pass 225 of loop unroll may have, but is not limited to, a parameter of integer type representing a unroll depth.

The configuration database 240 may store at least one optimization configuration CONFIGURATION1, CONFIGURATION2, or CONFIGURATIONN for each program PROGRAM1 or PROGRAM2. Each optimization configuration CONFIGURATION1, CONFIGURATION2, and CONFIGURATIONN may include a plurality of optimization combinations for a plurality of functions included in a corresponding program. The performance profiler 250 may receive, as an input, the object program 265 and 275 that is optimized with an optimization configuration, and may measure an execution time of the object program 265 and 275. The measured execution time may be stored along with the optimization configuration in the configuration database 240.

For example, as illustrated in FIG. 2A, when the iterative compilation system 200 compiles an original source program 260 of which an optimization configuration of a previous version program is not stored in the configuration database 240, the iterative compilation system 200 may search optimization combinations of the functions FUNC1, FUNC2, and FUNC3 by performing iterative compilation on each of the functions FUNC1, FUNC2, and FUNC3 on a function-by-function basis, and may generate the object program 265 in the object language by compiling the original source program 260 in the source language with the searched optimization combinations. For example, the iterative compilation module 230 may set a combination of the optimization passes 225 included in the optimization pool 220 with respect to each function FUNC1, FUNC2, and FUNC3, and may change the combination of the optimization passes 225 while the compiler 210 iteratively compiles the original source program 260.

In FIG. 2A, the iterative compilation module 230 may set an optimization combination sequentially including a first optimization pass OPT1 and a fifth optimization pass OPT5 with respect to a first original function FUNC1, an optimization combination sequentially including a sixth optimization pass OPT6 and a fourth optimization pass OPT4 with respect to a second original function FUNC2, and an optimization combination sequentially including a third optimization pass OPT3 and a second optimization pass OPT2 with respect to a third original function FUNC3. The compiler 210 may compile the original source program 260 with the optimization combinations (or an optimization configuration) set by the iterative compilation module 230.

Further, at the next compilation, the iterative compilation module 230 may change one of the optimization combinations for one of the first through third original functions FUNC1, FUNC2, and FUNC3 (e.g., addition or deletion of at least one optimization pass to or from the optimization combination, or changing an order of the optimization passes in the optimization combination), and the compiler 210 may compile again the original source program 260 with an optimization configuration including the changed optimization combination. Additionally, the object program 265 compiled with the optimization configuration and having the object language may be provided to the performance profiler 250, and the performance profiler 250 may measure the execution time of the object program 265. The optimization configuration set by the iterative compilation module 230 and the execution time measured by the performance profiler 250 may be stored in the configuration database 240.

The change of the optimization combination on a function-by-function basis by the iterative compilation module 230, the compilation of the original source program 260, the measurement of the execution time by the performance profiler 250, and the storage of the optimization configuration and the execution time in the configuration database 240 may be repeatedly performed. After these operations, one optimization configuration may be finally selected among a plurality of optimization configurations CONFIGURATION1, CONFIGURATION2, and CONFIGURATIONN, and the selected optimization configuration may be used in compiling an updated source program 270 that is updated from the original source program 260. For example, an optimization configuration (e.g., CONFIGURATION1) having the shortest execution time may be selected and used in compiling the updated source program 270.

As illustrated in FIG. 2B, when the iterative compilation system 200 compiles the updated source program 270 that is updated from the original source program 260 of which the optimization configuration CONFIGURATION1 is stored in the configuration database 240, the compiler 210 may optimize and compile the updated source program 270 using the optimization configuration CONFIGURATION1 for the original source program 260. For example, the compiler 210 may search a new optimization combination with respect to a first updated function FUNC4 having no corresponding original function and a second updated function FUNC2' that is changed from a corresponding original function FUNC2. However, with respect to a third updated function FUNC3 that is not changed (or having the same bloom filter value) from a corresponding original function FUNC3, the compiler 210 may not perform the optimization combination search, such as the iterative compilation, and may use the optimization combination that is previously applied to the corresponding original function FUNC3 and is included in the optimization configuration CONFIGURATION1 stored in the configuration database 240. Accordingly, the iterative compilation system 200 may improve the optimization performance by performing the iterative compilation on a function-by-function basis, and may reduce the compilation time of the updated source program 270 by using the optimization configuration CONFIGURATION1 for the original source program 260 when compiling the updated source program 270.

Figure 4:
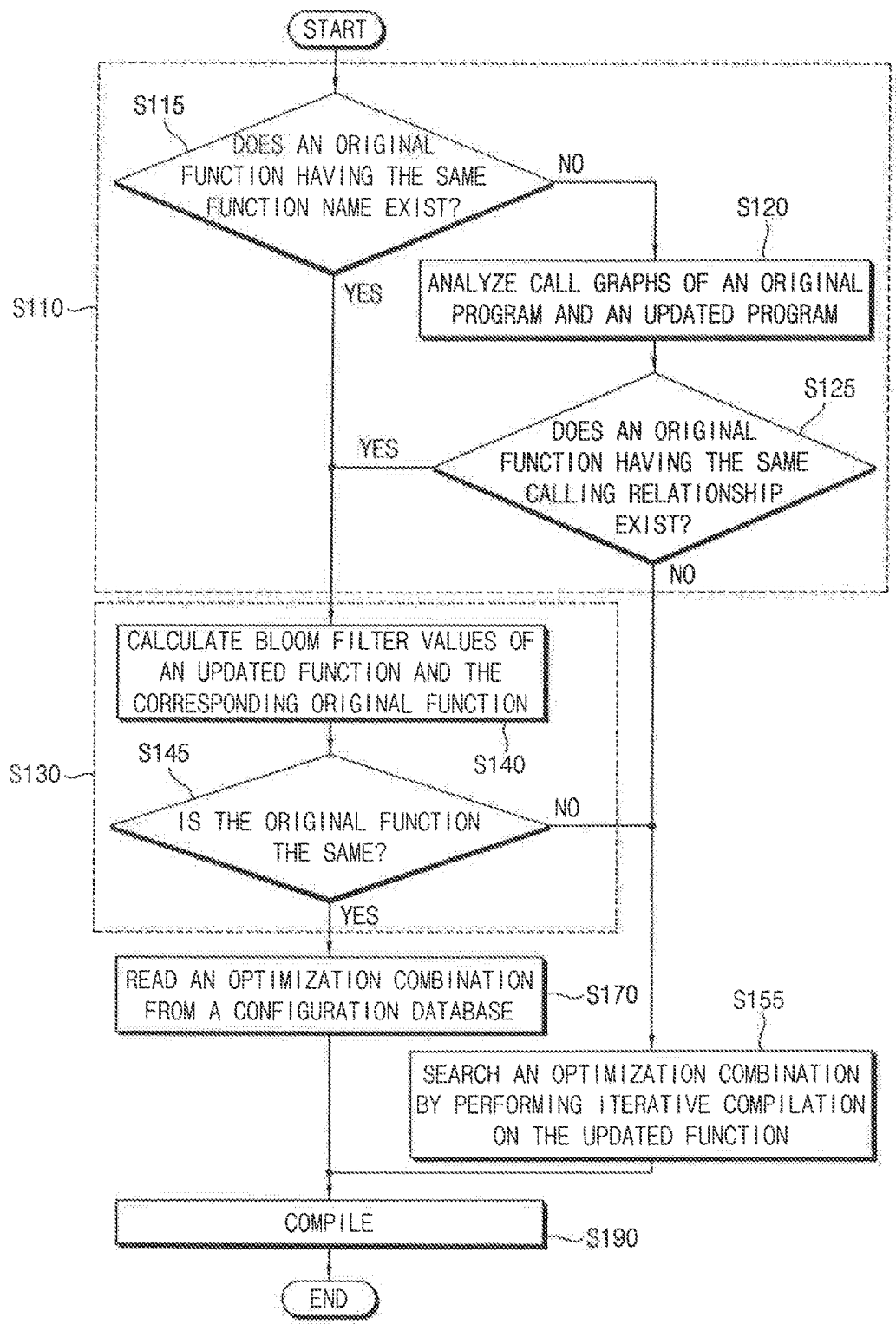
FIG. 4 is a flowchart illustrating a method of compiling an updated program according to exemplary embodiments of the present inventive concept.
Figure 5A:
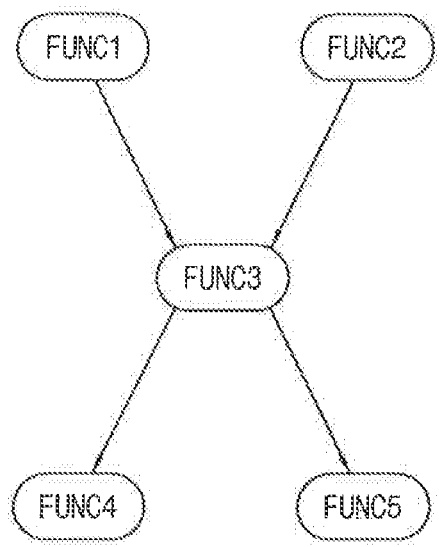
FIG. 5A is a diagram illustrating a call graph of an original program.
Figure 5B:
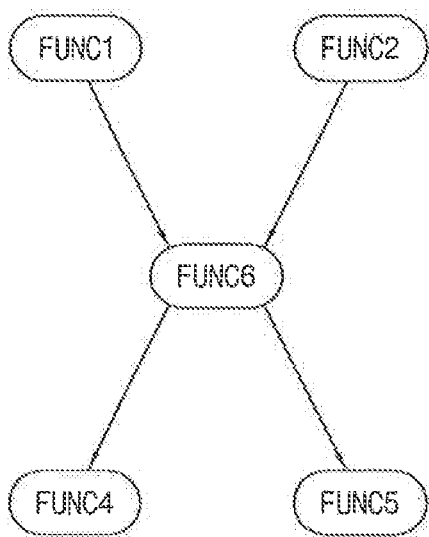
FIG. 5B is a diagram illustrating a call graph of an updated program according to exemplary embodiments of the present inventive concept.

FIG. 4 is a flowchart illustrating a method of compiling an updated program according to exemplary embodiments of the present inventive concept, FIG. 5A is a diagram illustrating a call graph of an original program according to exemplary embodiments of the present inventive concept, and FIG. 5B is a diagram illustrating a call graph of an updated program according to exemplary embodiments of the present inventive concept.

Referring to FIG. 4, to determine whether an original function corresponding to each updated function exists (S110), function names (S115) and/or calling relationships (S125) may be used. In exemplary embodiments of the present inventive concept, if a first original function has a function name that is the same as a function name of a first updated function (S115: YES), the first original function may be determined as corresponding to the first updated function. If the first original function having the function name that is the same as the function name of the first updated function does not exist (S115: NO), a call graph of the original program and a call graph of the updated program may be analyzed (S120). If an original function, e.g., the first original function, having a calling relationship that is the same as a calling relationship of the first updated function exists (S125: YES), the first original function may be determined as corresponding to the first updated function.

For example, as illustrated in FIGS. 5A and 5B, first and second original functions FUNC1 and FUNC2 call a third original function FUNC3, the third original function FUNC3 calls fourth and fifth original functions FUNC4 and FUNC5, first and second updated functions FUNC1 and FUNC2 call a third updated function FUNC6, and the third updated function FUNC6 calls fourth and fifth updated functions FUNC4 and FUNC5. Even if the third original function FUNC3 and the third updated function FUNC6 have different function names, the third original function FUNC3 may be determined as an original function corresponding to the third updated function FUNC6.

To determine whether the first updated function is changed from the first original function (S130), bloom filter values may be compared. In exemplary embodiments of the present inventive concept, an updated bloom filter value may be calculated by performing bloom filtering on instructions included in the first updated function, and an original bloom filter value may be calculated by performing bloom filtering on instructions included in the first original function (S140). If the updated bloom filter value is different from the original bloom filter value (S145: NO), it may be determined that the first updated function is changed from the first original function. If the updated bloom filter value is equal to the original bloom filter value (S145: YES), it may be determined that the first updated function is not changed from the first original function.

In exemplary embodiments of the present inventive concept, in a case where an original function having a function name or a calling relationship the same as that of the first updated function does not exist (S115: NO and S125: NO), or in a case where the updated bloom filter value of the first updated function is different from the original bloom filter value of the first original function (S145: NO), iterative compilation may be performed on the first updated function to search or obtain a first optimization combination for the first updated function (S155). On the other hand, in a case where the first original function has a function name or a calling relationship the same as that of the first updated function (S115: YES or S125: YES), and the updated bloom filter value of the first updated function is equal to the original bloom filter value of the first original function (S145: YES), a second optimization combination applied to the first original function may be read as an optimization combination for the first updated function from a configuration database (S170). The updated program may be compiled using one of the first optimization combination and the second optimization combination (S190).

Figure 6:
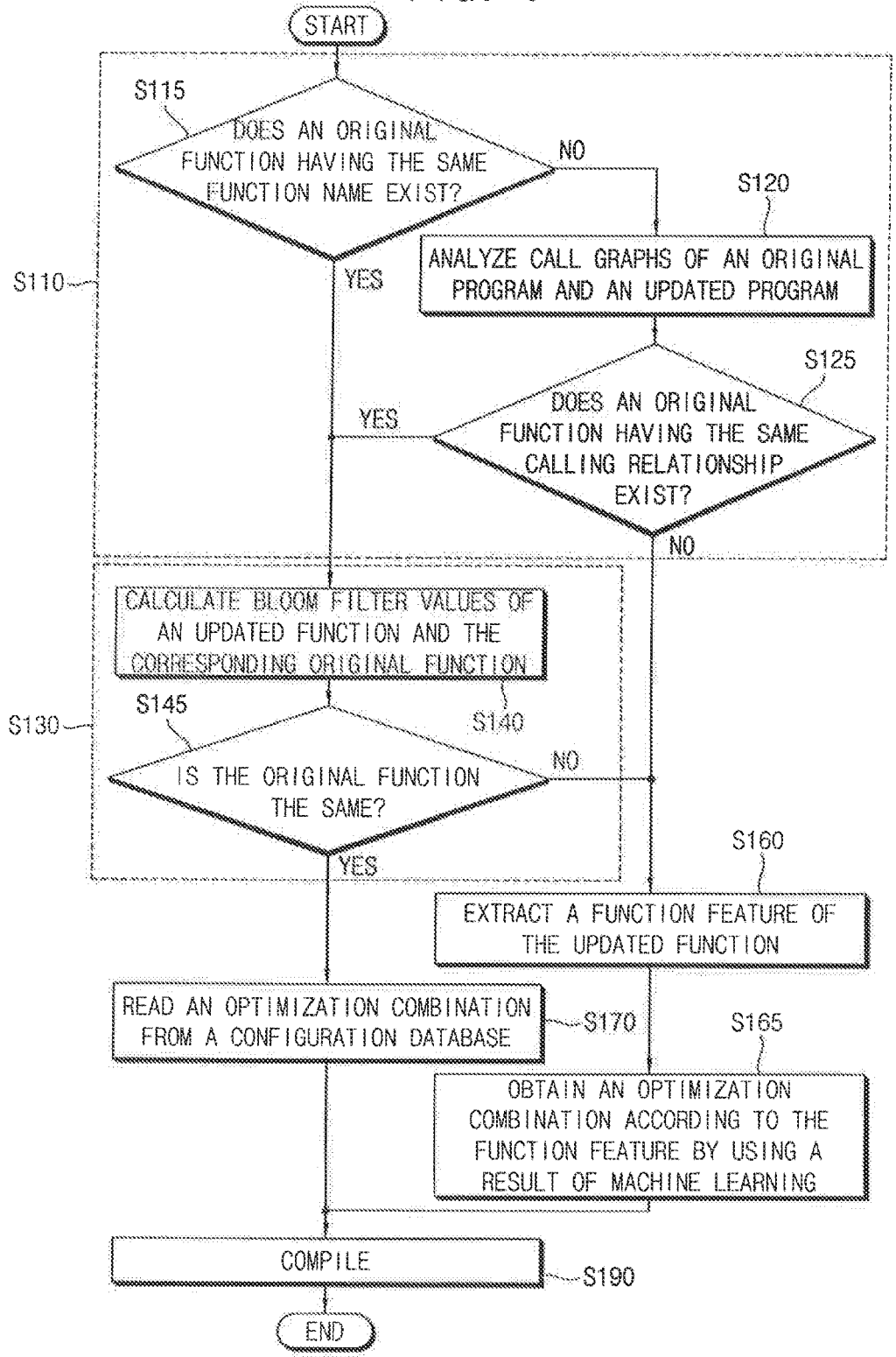
FIG. 6 is a flowchart illustrating a method of compiling an updated program according to exemplary embodiments of the present inventive concept.

FIG. 6 is a flowchart illustrating a method of compiling an updated program according to exemplary embodiments of the present inventive concept.

In a compilation method of FIG. 6, instead of iterative compilation (S155) for the first updated function as illustrated in FIG. 4, a first optimization combination may be searched using a result of machine learning (S160 and S165). Further, before the compilation method of FIG. 6 is performed, machine learning for optimization combinations according to function features of original functions included in one or more original programs may be performed. In exemplary embodiments of the present inventive concept, the machine learning for the optimization combinations according to the function features may be support vector machine (SVM) learning.

Referring to FIG. 6, in a case where the first original function corresponding to the first updated function does not exist (S115: NO and S125: NO), or in a case where the first updated function is changed from the first original function (S145: NO), a function feature of the first updated function may be extracted (S160). In exemplary embodiments of the present inventive concept, the function feature may include a basic feature for a basic block included in a function, an instruction level feature for instructions included in the function, and/or a loop level feature for a loop included in the function. For example, the basic feature may include the number of basic blocks and/or the number of instructions, but is not limited thereto. The instruction level feature may include the number of associative instructions, the number of load instructions, the number of store instructions, the number of branch instructions, the number of call instructions, the number of invoke instructions, the number of compare instructions, the number of allocate instructions, the number of switch instructions, the number of get element pointer instructions, and/or the number of PHI nodes, but is not limited thereto. The loop level feature may include the number of loops, the number of nested loops, a loop maximum depth, existence or nonexistence of an LCSSA form, existence or nonexistence of a recursive LCSSA form, and/or possibility of application of loop simplify, but is not limited thereto.

The first optimization combination for the first updated function may be obtained according to the extracted function feature of the first updated function by using a result of the machine learning (S165). Thus, although iterative compilation for the first updated function is not performed, the first optimization combination suitable for the function feature (or a function characteristic) of the first updated function may be obtained using the result of the machine learning. Accordingly, the compilation time of the updated program may be further reduced.

Figure 7:
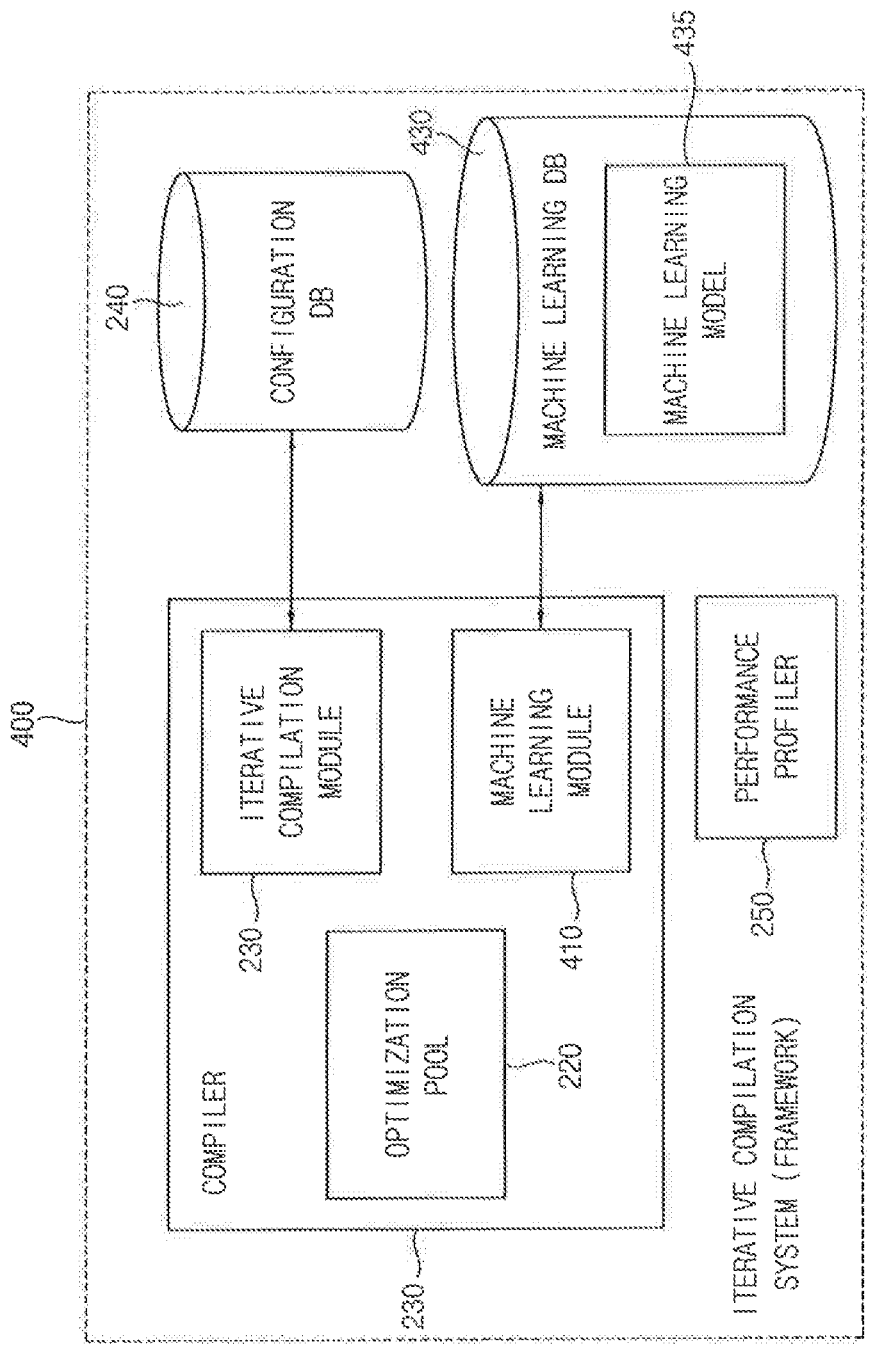
FIG. 7 is a block diagram illustrating an iterative compilation system that performs a compilation method of FIG. 6 according to exemplary embodiments of the present inventive concept.

FIG. 7 is a block diagram illustrating an iterative compilation system that performs a compilation method of FIG. 6 according to exemplary embodiments of the present inventive concept.

Referring to FIG. 7, as compared with the iterative compilation system 200 of FIGS. 2A and 2B, an iterative compilation system (or an iterative compilation framework) 400 may further include a machine learning module 410 and a machine learning database 430.

The machine learning module 410 may perform machine learning for optimization combinations of a plurality of functions according to function features of the plurality of functions included in one or more programs, and may store a machine learning model 435 as a result of the machine learning in the machine learning database 430. Further, the machine learning module 410 may provide an optimization combination according to a function feature of any function by using the machine learning model 435. For example, the machine learning module 410 may provide, with respect to functions of a new program, optimization combinations according to function features of the functions, or may provide, with respect to an updated function having no corresponding original function or having changed from the corresponding original function, an optimization combination according to the function feature of the updated function.

In exemplary embodiments of the present inventive concept, the iterative compilation system 400 of FIG. 7 may perform the compilation method of FIG. 6. In exemplary embodiments of the present inventive concept, the iterative compilation system 400 of FIG. 7 may perform a compilation method of FIGS. 8A and 8B described below.

Figure 8A:
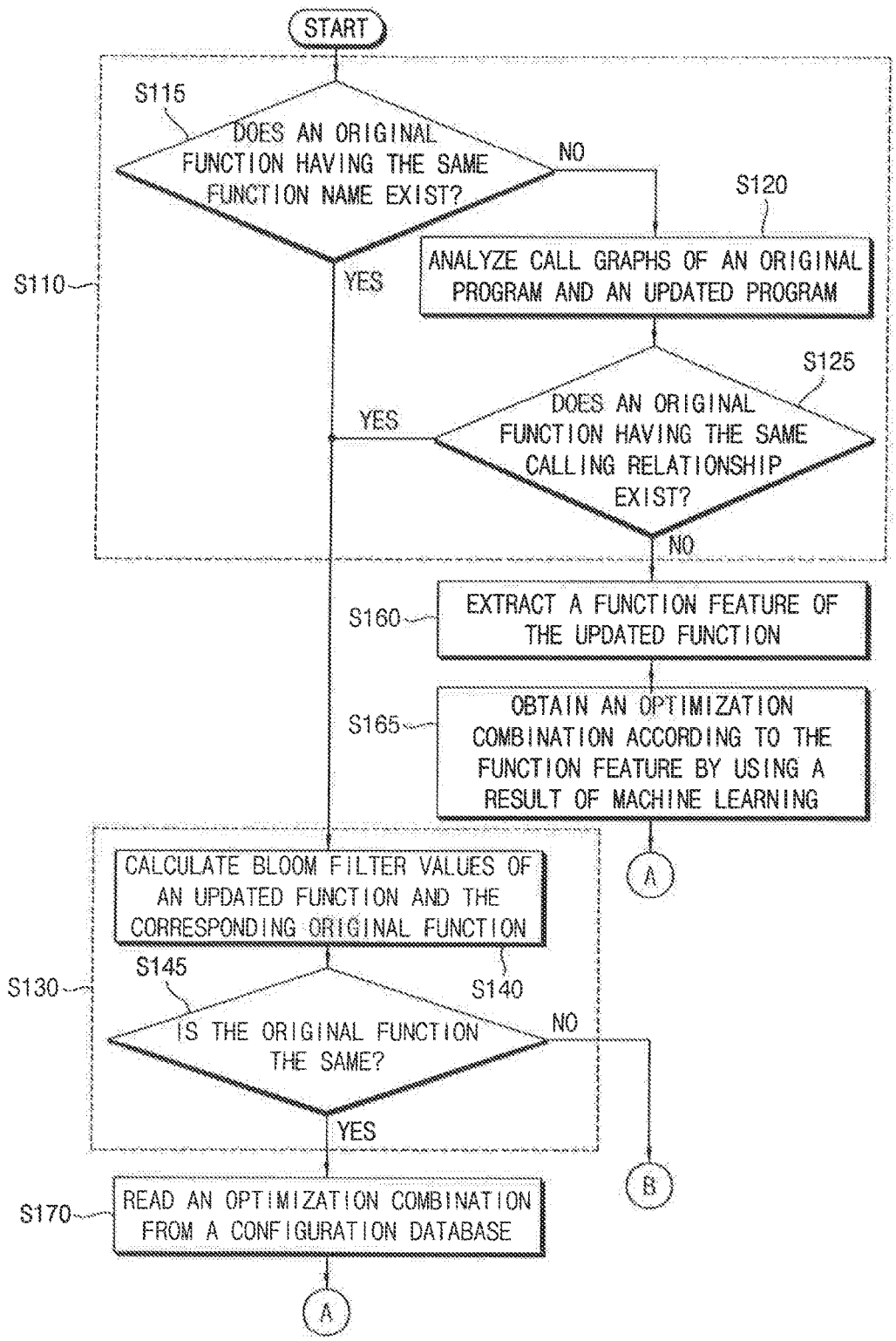
FIGS. 8A and 8B are a flowchart illustrating a method of compiling an updated program according to exemplary embodiments of the present inventive concept.
Figure 8B:
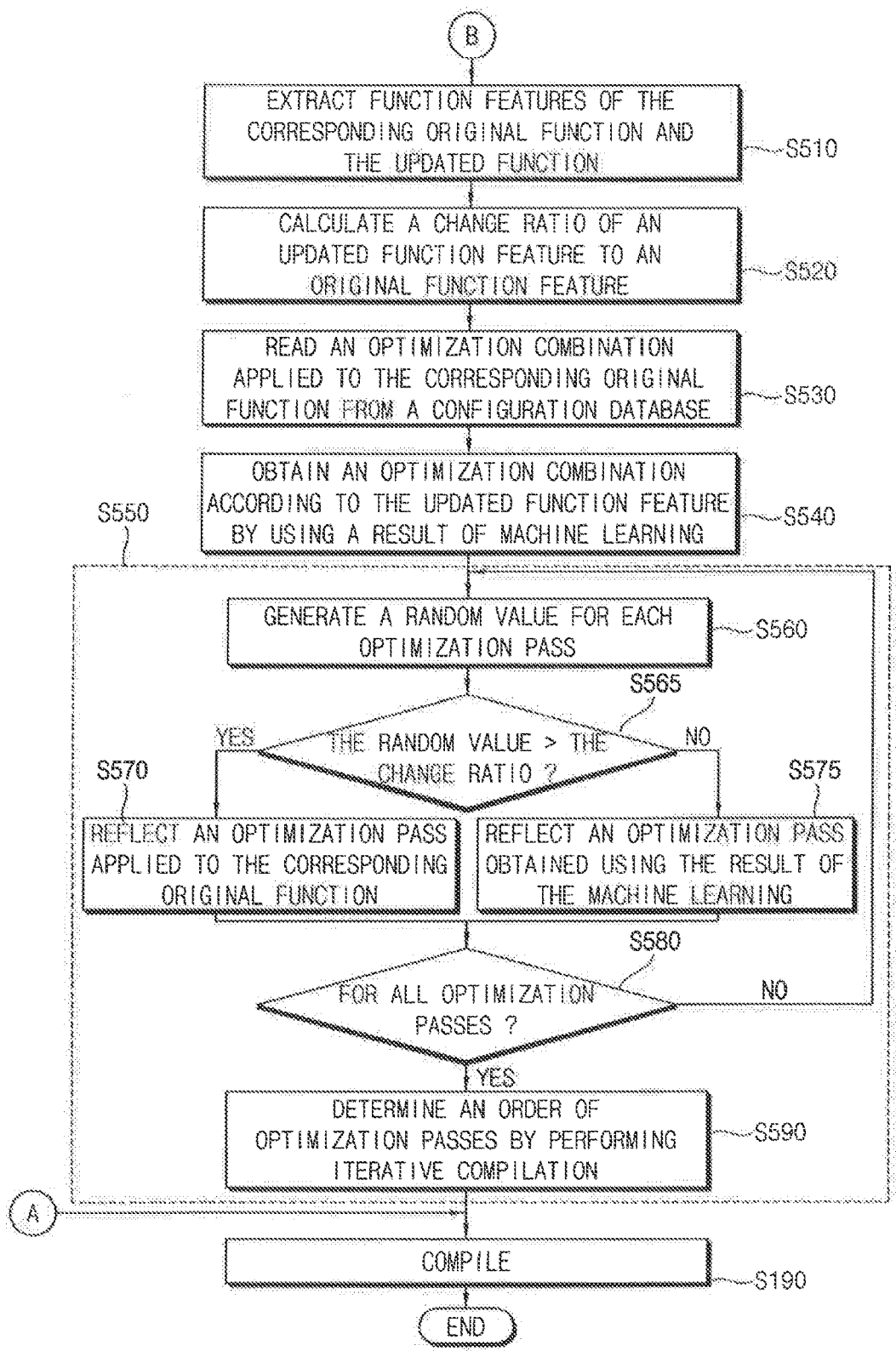

FIGS. 8A and 8B are a flowchart illustrating a method of compiling an updated program according to exemplary embodiments of the present inventive concept.

A compilation method of FIGS. 8A and 8B may have the same or similar steps as the compilation method of FIG. 6, except that, with respect to an updated function changed from a corresponding original function, or an updated function having a bloom filter value different from a bloom filter value of the corresponding original function, an optimization combination may be generated by reflecting an optimization combination applied to the corresponding original function and an optimization combination obtained using a result of machine learning with a desired (or predetermined) ratio (S510, S520, S530, S540, and S550).

Referring to FIGS. 8A and 8B, with respect to the first updated function having the bloom filter value different from the bloom filter value of the first original function (S145: NO), an updated function feature of the updated function and an original function feature of the first original function may be extracted (S510). In exemplary embodiments of the present inventive concept, each of the updated function feature and the original function feature may include at least one of a basic feature, an instruction level feature, or a loop level feature.

A change ratio of the updated function feature to the original function feature may be calculated (S520). For example, the change ratio may be calculated by setting a maximum change amount for each item (e.g., the number of basic blocks, the number of instructions, the number of associative instructions, the number of load instructions, the number of store instructions, the number of branch instructions, the number of call instructions, the number of invoke instructions, the number of compare instructions, the number of allocate instructions, the number of switch instructions, the number of get element pointer instructions, the number of PHI nodes, the number of loops, the number of nested loops, a loop maximum depth, existence or nonexistence of an LCSSA form, existence or nonexistence of a recursive LCSSA form, possibility of application of loop simplify, or the like) of the function feature and by determining a change ratio of a change amount of the updated function feature from the original function feature to the maximum change amount. In exemplary embodiments of the present inventive concept, the change ratio of the updated function feature to the original function feature may have a value ranging from 0 to 1.

The optimization combination applied to the first original function may be read from a configuration database (S530), the optimization combination according to the updated function feature may be obtained using the result of the machine learning (S540), and the optimization combination for the first updated function may be generated by reflecting the optimization combination obtained using the result of the machine learning and the optimization combination applied to the first original function with the change ratio of the updated function feature to the original function feature (S550). For example, the change ratio may have a value ranging from 0 to 1, the optimization combination applied to the first original function may be reflected with a relatively high ratio when the change ratio has a value close to 0, e.g., less than a predetermined threshold, and the optimization combination obtained using the result of the machine learning may be reflected with a relatively high ratio when the change ratio has a value close to 1, e.g., greater than or equal to the predetermined threshold.

In exemplary embodiments of the present inventive concept, to generate the optimization combination for the first updated function (S550), a random value (having a value between 0 and 1) for each of a plurality of optimization passes included in an optimization pool may be generated (S560), and the random value and the change ratio may be compared with respect to each optimization pass (S565).

If the random value of an optimization pass is greater than the change ratio (S565: YES), the optimization combination applied to the first original function may be reflected with respect to the optimization pass (S570). In other words, the optimization pass may be included in the optimization combination for the first updated function when the optimization pass is included in the optimization combination applied to the first original function, and the optimization pass may not be included in the optimization combination for the first updated function when the optimization pass is not included in the optimization combination applied to the first original function. Further, a parameter of the optimization pass in the optimization combination applied to the first original function may be used as a parameter of the optimization pass in the optimization combination for the first updated function.

If the random value of an optimization pass is less than or equal to the change ratio (S565: NO), the optimization combination obtained using the result of the machine learning may be reflected with respect to the optimization pass (S575). In other words, the optimization pass may be included in the optimization combination for the first updated function when the optimization pass is included in the optimization combination obtained using the result of the machine learning, and the optimization pass may not be included in the optimization combination for the first updated function when the optimization pass is not included in the optimization combination obtained using the result of the machine learning. Further, a parameter of the optimization pass in the optimization combination obtained using the result of the machine learning may be used as a parameter of the optimization pass in the optimization combination for the first updated function.

Generating the random value (S560), comparing the random value with the change ratio (S565), and reflecting the optimization combination applied to the first original function or the optimization combination obtained using the result of the machine learning (S570 or S575) may be repeated until these operations are performed with respect to all optimization passes included in the optimization pool (S580). In exemplary embodiments of the present inventive concept, after these operations are performed with respect to all optimization passes (S580: YES), iterative compilation may be performed on the optimization passes included in the optimization combination for the first updated function to determine an order of the optimization passes included in the optimization combination for the first updated function (S590). Then, the updated program may be compiled (S190), as described above.

As described above, with respect to the first updated function changed from the first original function, the optimization combination may be generated by reflecting the optimization combination obtained using the result of the machine learning and the optimization combination applied to the first original function with the change ratio of the updated function feature to the original function feature, thus improving optimization performance while reducing a compilation time.

Figure 9:
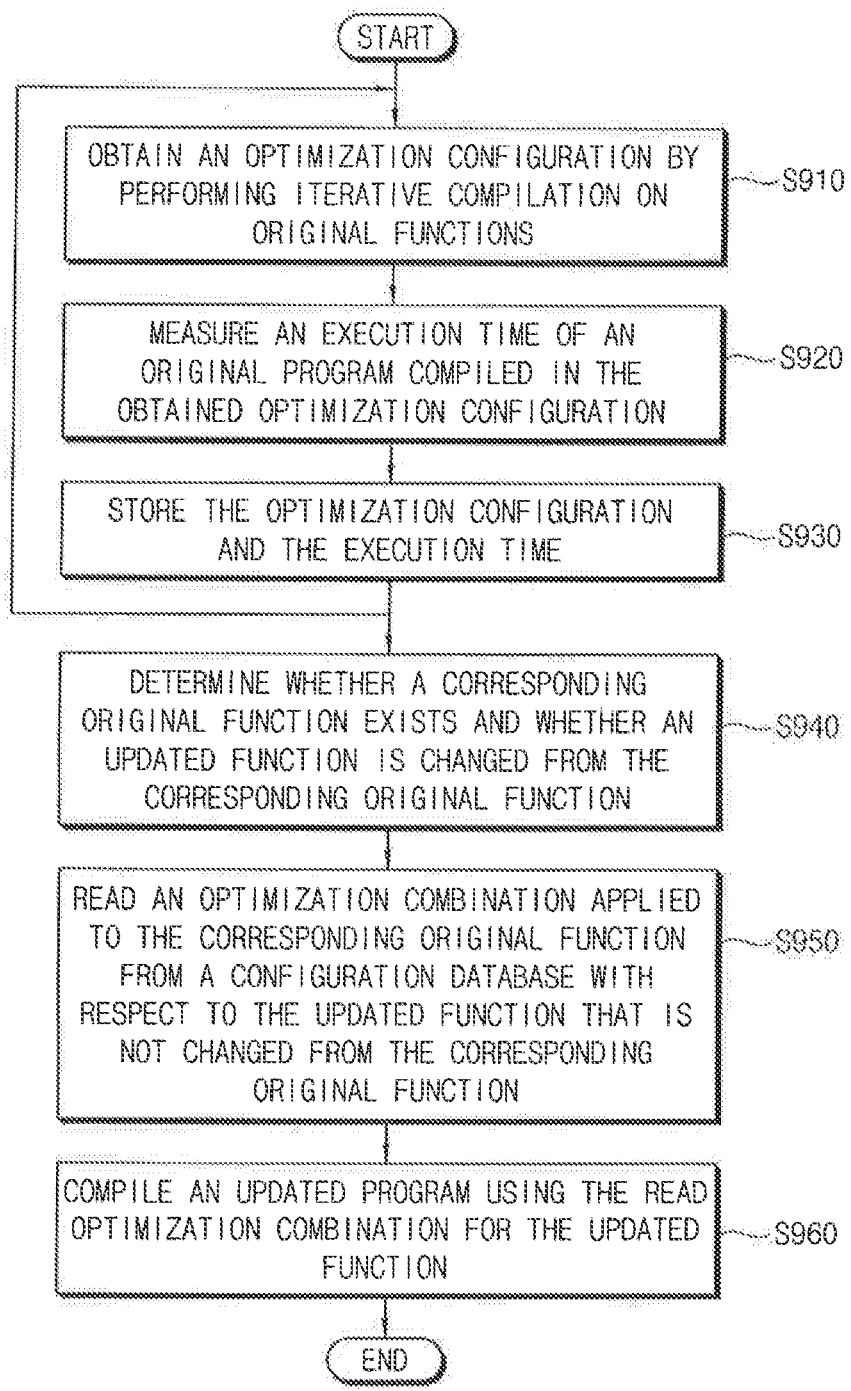
FIG. 9 is a flowchart illustrating a compilation method according to exemplary embodiments of the present inventive concept.

FIG. 9 is a flowchart illustrating a compilation method according to exemplary embodiments of the present inventive concept.

Referring to FIG. 9, in a method of compiling an updated program having a plurality of updated functions that is updated from an original program having a plurality of original functions, an optimization configuration including optimization combinations of the original functions may be obtained by performing iterative compilation for each of the plurality of original functions of the original program (S910). Further, an execution time of the original program compiled with the obtained optimization configuration may be measured by using a performance profiler (S920). The obtained optimization configuration and the measured execution time may be stored in a configuration database (S930).

With respect to each updated function, it may be determined whether an original function, e.g., the first original function, corresponding to each updated function, e.g., the first updated function, exists among the original functions, and it may be determined whether the first updated function is changed from the first original function (S940). When there is the corresponding first original function for the first updated function and the first updated function is not changed from the first original function, an optimization combination applied to the first original function, among the optimization combinations included in the optimization configuration, may be read from the configuration database (S950). The updated program may be compiled using the read optimization combination for the first updated function that has the corresponding first original function and is not changed from the first original function (S960). Accordingly, a compilation time of the updated program may be reduced, and optimization performance for the updated program may be improved.

In exemplary embodiments of the present inventive concept, the compilation method may be implemented in a form of a computer product including program codes that are readable by a computer and are stored in a non-transitory computer readable medium. The computer readable program codes may be provided to processors of various computers or other data processing devices. The computer readable medium may be a computer readable signal medium or a computer readable recording medium. For example, the computer readable recording medium may be any tangible medium storing or including a program which is included in or connected to an instruction executing system, equipment, or device.

The present inventive concept may be applied to any translation or compilation program, device, or system that translates or compiles a program or a source code.

As described above, according to exemplary embodiments of the present inventive concept, in the method of compiling the updated program having updated functions that is updated from the original program having original functions, with respect to an updated function that has a corresponding original function and is not changed from the corresponding original function, the updated program is compiled using an optimization combination applied to the corresponding original function without an additional optimization combination search for the updated function. Accordingly, compilation time of the updated program may be reduced, and optimization performance may be improved.

While the present inventive concept has been shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. A method of compiling an updated program having a plurality of updated functions that is updated from an original program having a plurality of original functions, the method comprising:
   determining whether a first original function among the plurality of original functions corresponding to a first updated function among the plurality of updated functions exists;
   determining whether the first updated function is changed from the first original function;
   searching a first optimization combination for the first updated function when the first original function does not exist or when the first updated function is changed from the first original function;
   reading a second optimization combination applied to the first original function from a configuration database storing optimization combinations for the plurality of original functions, when the first original function exists and the first updated function is not changed from the first original function; and
   compiling the updated program using the first optimization combination or the second optimization combination.

2. The method of claim 1, wherein each of the first optimization combination and the second optimization combination includes information about whether optimization passes thereof included in an optimization pool are applied or not, parameters of the applied optimization passes, and an order of the applied optimization passes.

3. The method of claim 1, wherein determining whether the first original function corresponding to the first updated function exists includes:
   determining whether the first original function has a function name the same as a function name of the first updated function.

4. The method of claim 1, wherein determining whether the first original function corresponding to the first updated function exists includes:
   analyzing a call graph of the original program and a call graph of the updated program; and
   determining whether the first original function has a calling relationship the same as a calling relationship of the first updated function.

5. The method of claim 1, wherein determining whether the first updated function is changed from the first original function includes:
   calculating an updated bloom filter value by performing bloom filtering on instructions included in the first updated function;
   calculating an original bloom filter value by performing bloom filtering on instructions included in the first original function; and
   determining whether the first updated function is changed based on whether the updated bloom filter value is equal to the original bloom filter value.

6. The method of claim 1, wherein searching the first optimization combination for the first updated function includes:
   obtaining the first optimization combination by performing iterative compilation on the first updated function when the first original function does not exist.

7. The method of claim 1, further comprising:
   performing machine learning for optimization combinations according to function features of the plurality of original functions,
   wherein searching the first optimization combination for the first updated function includes:
      extracting a function feature of the first updated function when the first original function does not exist; and
      obtaining the first optimization combination according to the extracted function feature of the first updated function by using a result of the machine learning.

8. The method of claim 7, wherein the extracted function feature of the first updated function is a basic feature for a basic block included in the first updated function, an instruction level feature for instructions included in the first updated function, or a loop level feature for a loop included in the first updated function.

9. The method of claim 1, wherein searching the first optimization combination for the first updated function includes:
   obtaining the first optimization combination by performing iterative compilation on the first updated function when the first updated function is changed from the first original function.

10. The method of claim 1, further comprising:
    performing machine learning for optimization combinations according to function features of the plurality of original functions,
    wherein searching the first optimization combination for the first updated function includes:
       extracting a function feature of the first updated function when the first updated function is changed from the first original function; and
       obtaining the first optimization combination according to the extracted function feature of the first updated function by using a result of the machine learning.

11. The method of claim 1, further comprising:
    performing machine learning for optimization combinations according to function features of the plurality of original functions,
    wherein searching the first optimization combination for the first updated function includes:
       extracting an original function feature of the first original function and an updated function feature of the first updated function when the first updated function is changed from the first original function;
       calculating a change ratio of the updated function feature to the original function feature;
       reading a third optimization combination applied to the first original function from the configuration database;
       obtaining a fourth optimization combination according to the updated function feature by using a result of the machine learning; and
       generating the first optimization combination for the first updated function by reflecting the fourth optimization combination or the third optimization combination with the change ratio.

12. The method of claim 11, wherein the change ratio has a value ranging from 0 to 1,
    wherein, when the change ratio is less than a predetermined threshold, the third optimization combination is reflected to the first optimization combination, and
    wherein, when the change ratio is greater than or equal to the predetermined threshold, the fourth optimization combination is reflected to the first optimization combination.

13. The method of claim 11, wherein generating the first optimization combination by reflecting the fourth optimization combination or the third optimization combination with the change ratio includes:
  comparing a random value with the change ratio, wherein the random value is generated with respect to each optimization pass of a plurality of optimization passes included in an optimization pool;
  reflecting the third optimization combination with respect to the each optimization pass when the random value is greater than the change ratio; and
  reflecting the fourth optimization combination with respect to the each optimization pass when the random value is less than or equal to the change ratio.

14. The method of claim 13, wherein generating the first optimization combination by reflecting the fourth optimization combination or the third optimization combination with the change ratio further includes:
  determining an order of optimization passes included in the first optimization combination by performing iterative compilation on the optimization passes included in the first optimization combination.

15. A method of compiling an updated program having a plurality of updated functions that is updated from an original program having a plurality of original functions, the method comprising:
  performing machine learning for optimization combinations according to function features of the plurality of original functions of the original program;
  determining whether a first original function among the plurality of original functions corresponding to a first updated function among the plurality of updated functions exists;
  obtaining a first optimization combination according to a function feature of the first updated function by using a result of the machine learning when the first original function does not exist;
  determining whether the first updated function is changed from the first original function when the first original function exists;
  reading a second optimization combination applied to the first original function from a configuration database storing optimization combinations for the plurality of original functions, when the first updated function is not changed from the first original function;
  generating a third optimization combination for the first updated function by reflecting a fourth optimization combination obtained using the result of the machine learning and a fifth optimization combination applied to the first original function with a change ratio of a function feature of the first updated function to a function feature of the first original function, when the first updated function is changed from the first original function; and
  compiling the updated program using the first optimization combination, the second optimization combination, or the third optimization combination.

16. A method of compiling an updated program having a plurality of updated functions that is updated from an original program having a plurality of original functions, the method comprising:
  obtaining an optimization configuration including optimization combinations of the plurality of original functions by performing iterative compilation for each of the plurality of original functions of the original program;
  storing the optimization configuration in a configuration database;
  determining whether a first original function among the plurality of original functions corresponding to a first updated function among the plurality of updated functions exists and whether the first updated function is changed from the first original function;
  reading a first optimization combination applied to the first original function, among the optimization combinations included in the optimization configuration, from the configuration database, when the first original function exists and the first updated function is not changed from the first original function; and
  compiling the updated program using the read first optimization combination.

17. The method of claim 16, further comprising:
  measuring, by using a performance profiler, an execution time of the original program compiled with the obtained optimization configuration,
  wherein the execution time is further stored in the configuration database.

18. The method of claim 16, further comprising:
  obtaining a second optimization combination by performing iterative compilation on the first updated function when the first original function does not exist or when the first updated function is changed from the first original function.

19. The method of claim 16, further comprising:
  performing machine learning for optimization combinations according to function features of the plurality of original functions; and
  storing a result of the machine learning in a machine learning database.

20. The method of claim 19, further comprising:
  obtaining a third optimization combination by using the result of the machine learning stored in the machine learning database when the first original function does not exist or when the first updated function is changed from the first original function.

* * * * *